(12) United States Patent
Karazor

(10) Patent No.: US 11,490,468 B2
(45) Date of Patent: Nov. 1, 2022

(54) INDUCTION COOKER, METHOD AND COMPUTER PROGRAM PRODUCT FOR ADJUSTING AIR GAP FOR INDUCTION COIL

(71) Applicant: Vestel Elektronik Sanayi ve Ticaret A.S., Manisa (TR)

(72) Inventor: Irfan Karazor, Manisa (TR)

(*) Notice: Subject to any disclaimer, the term of this patent is extended or adjusted under 35 U.S.C. 154(b) by 0 days.

(21) Appl. No.: 17/611,892

(22) PCT Filed: May 16, 2019

(86) PCT No.: PCT/EP2019/062692
§ 371 (c)(1),
(2) Date: Nov. 16, 2021

(87) PCT Pub. No.: WO2020/228964
PCT Pub. Date: Nov. 19, 2020

(65) Prior Publication Data
US 2022/0151034 A1    May 12, 2022

(51) Int. Cl.
*H05B 6/06* (2006.01)
*H05B 6/12* (2006.01)

(52) U.S. Cl.
CPC ........... *H05B 6/062* (2013.01); *H05B 6/1254* (2013.01)

(58) Field of Classification Search
CPC .. H05B 6/066; H05B 6/1254; G06F 17/30616
(Continued)

(56) References Cited

U.S. PATENT DOCUMENTS 3,781,503 A * 12/1973 Hamden, Jr. .......... H05B 6/062
363/124
3,989,916 A    11/1976 Amagami et al.
(Continued)

FOREIGN PATENT DOCUMENTS

EP    0713349 A1    5/1996
EP    2434836 A2    3/2012
(Continued)

OTHER PUBLICATIONS

International Search Report and the Written Opinion of the International Searching Authority, or the Declaration for Application No. PCT/EP2019/062692 dated Feb. 13, 2020 (11 pages).

*Primary Examiner* — Quang T Van
(74) *Attorney, Agent, or Firm* — J. Miguel Hernandez; James R. Gourley; Carstens, Allen & Gourley, LLP

(57) ABSTRACT

Induction cooker having an induction coil, a supporting structure, a ferromagnetic element and a non-ferromagnetic element. The induction coil is arranged to receive a varying electric current and produce a corresponding varying electromagnetic field. The supporting structure is arranged to support a ferromagnetic object above the induction coil, the ferromagnetic object being placed in the corresponding varying electromagnetic field to be magnetically coupled to the induction coil, thereby determining a mutual inductance between the induction coil and the ferromagnetic object. The ferromagnetic element and the non-ferromagnetic element are arranged to be located between the supporting structure and the induction coil and selectively move in the corresponding varying electromagnetic field based on a mutual inductance between the induction coil and the ferromagnetic object.

12 Claims, 2 Drawing Sheets

(58) Field of Classification Search
USPC ....... 219/620, 621, 622, 624, 627, 658, 660,
219/661, 665, 666, 675, 676; 363/124
See application file for complete search history.

(56) References Cited

U.S. PATENT DOCUMENTS

| | | | |
|---|---|---|---|
| 4,348,571 A * | 9/1982 | Dills | H05B 6/1254 |
| | | | 219/622 |
| 4,467,162 A | 8/1984 | Kondo et al. | |
| 5,658,482 A | 8/1997 | Gaspard | |
| 10,162,882 B2 * | 12/2018 | Franceschini | G06F 16/313 |
| 2007/0246459 A1 | 10/2007 | Loveless et al. | |
| 2018/0104742 A1 * | 4/2018 | Kottilingam | B33Y 10/00 |

FOREIGN PATENT DOCUMENTS

| | | | |
|---|---|---|---|
| EP | 2538749 A1 | 12/2012 | |
| FR | 2206644 A1 | 6/1974 | |

* cited by examiner

INDUCTION COOKER, METHOD AND COMPUTER PROGRAM PRODUCT FOR ADJUSTING AIR GAP FOR INDUCTION COIL

CROSS REFERENCE TO RELATED APPLICATION

This application is a U.S. 371 application from PCT/EP2019/062692 entitled "Induction Cooker, Method and Computer Program Product for Adjusting Air Gap for Induction Coil" filed on May 16, 2019 and published as WO 2020/228964 A1 on Nov. 19, 2020. The technical disclosures of every application and publication listed in this paragraph are hereby incorporated herein by reference.

TECHNICAL FIELD

The present disclosure relates to an induction cooker, method and computer program product for adjusting air gap for induction coil.

BACKGROUND

Induction cookers are known in which a varying electric current is passed through an induction coil, the coil therefore producing a corresponding varying electromagnetic field. The varying electromagnetic field induces a varying eddy current in a ferromagnetic cooking vessel or the like when the cooking vessel is placed in close proximity to the induction coil, which in turn heats the cooking vessel and therefore the contents of the cooking vessel.

U.S. Pat. No. 4,467,162A discloses an induction heating apparatus comprising a top plate for receiving a container of magnetisable material to be heated, a bottom plate made of an iron material, a heating coil disposed in a space between the top plate and the bottom plate, and a shielding plate member made of a non-magnetisable metallic material and disposed in a space between the heating coil and the bottom plate. Although the plate member has the benefit of shielding the magnetic lines of flux leading out of the heating coil, it has the disadvantage of being in a fixed position, being located between the heating coil and the bottom plate and being made of one type of material, i.e., of a non-magnetisable material.

SUMMARY

According to a first aspect disclosed herein, there may be provided an induction cooker comprising an induction coil, a supporting structure, a ferromagnetic element and a non-ferromagnetic element. The induction coil is arranged to receive a varying electric current and produce a corresponding varying electromagnetic field. The supporting structure is arranged to support a ferromagnetic object above the induction coil, the ferromagnetic object being placed in the corresponding varying electromagnetic field to be magnetically coupled to the induction coil, thereby determining a mutual inductance between the induction coil and the ferromagnetic object. The ferromagnetic element and the non-ferromagnetic element are arranged to be located between the supporting structure and the induction coil and selectively move in the corresponding varying electromagnetic field based on a mutual inductance between the induction coil and the ferromagnetic object.

Thus, the insertion of the ferromagnetic and/or non-ferromagnetic elements in the varying electromagnetic field causes the air gap between the induction coil and the ferromagnetic object magnetic and thereby the magnetic coupling between the induction coil and the ferromagnetic object magnetic to be modified and, due to the selective insertion, to be modified in an adjustable manner.

In an example of the first aspect, the ferromagnetic element and the non-ferromagnetic element may be arranged to move horizontally and/or vertically.

In an example of the first aspect, the ferromagnetic element may move in the corresponding varying electromagnetic field to increase the mutual inductance between the induction coil and the ferromagnetic object, and the non-ferromagnetic element may move in the corresponding varying electromagnetic field to reduce the mutual inductance between the induction coil and the ferromagnetic object.

In an example of the first aspect, the ferromagnetic element may move in the corresponding varying electromagnetic field to a position for which a value of mutual inductance between the induction coil and the ferromagnetic object is higher than the value of mutual inductance between the induction coil and the ferromagnetic object prior to displacement of the ferromagnetic element.

In an example of the first aspect, the non-ferromagnetic element may move in the corresponding varying electromagnetic field to a position for which a value of mutual inductance between the induction coil and the ferromagnetic object is lower than the value of mutual inductance between the induction coil and the ferromagnetic object prior to displacement of the non-ferromagnetic element.

In an example of the first aspect, the induction coil may be arranged to move toward or away from the ferromagnetic object.

According to a second aspect disclosed herein, there may be provided a method of operating an induction cooker. The method may comprise receiving, at an induction coil, a varying electric current; producing, at the induction coil, a corresponding varying electromagnetic field; supporting, at a supporting structure, a ferromagnetic object above the induction coil, the ferromagnetic object being placed in the corresponding varying electromagnetic field to be magnetically coupled to the induction coil, thereby determining a mutual inductance between the induction coil and the ferromagnetic object; and selectively moving a ferromagnetic element and/or a non-ferromagnetic element in the corresponding varying electromagnetic field based on a mutual inductance between the induction coil and the ferromagnetic object, the ferromagnetic element and the non-ferromagnetic element being arranged to be located between the supporting structure and the induction coil.

In an example of the second aspect, selectively moving a ferromagnetic element and/or a non-ferromagnetic element may comprise moving the ferromagnetic element in the corresponding varying electromagnetic field to increase the mutual inductance between the induction coil and the ferromagnetic object; and moving the non-ferromagnetic element in the corresponding varying electromagnetic field to reduce the mutual inductance between the induction coil and the ferromagnetic object.

In an example of the second aspect, selectively moving a ferromagnetic element may comprise moving the ferromagnetic element in the corresponding varying electromagnetic field to a position for which a value of mutual inductance between the induction coil and the ferromagnetic object is higher than the value of mutual inductance between the induction coil and the ferromagnetic object prior to displacement of the ferromagnetic element.

In an example of the second aspect, selectively moving a non-ferromagnetic element may comprise moving the non-ferromagnetic element in the corresponding varying electromagnetic field to a position for which a value of mutual inductance between the induction coil and the ferromagnetic object is lower than the value of mutual inductance between the induction coil and the ferromagnetic object prior to displacement of the non-ferromagnetic element.

In an example of the second aspect, the ferromagnetic element and the non-ferromagnetic element may be arranged to move horizontally and/or vertically.

In an example of the second aspect, the induction coil may be arranged to move toward or away from the ferromagnetic object.

According to a third aspect disclosed herein, there may be provided a computer program product comprising program instructions such that, when the computer program is executed on a device, the device is arranged to carry out a method according to any of the second aspect and examples of the second aspect.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

The present disclosure is directed toward induction cooking using direct induction heating of ferromagnetic cookware, rather than relying on indirect radiation, convection, or thermal conduction.

Typically, an induction cooker comprises a coil (also known as induction coil or work coil), which is placed below the ferromagnetic cookware and through which passes a varying electric current, thereby producing a corresponding varying electromagnetic field. When the ferromagnetic cookware is placed close to the induction coil, the varying electromagnetic field induces in the ferromagnetic cookware a corresponding varying electromotive force (emf). The emf is a function of a mutual inductance between the ferromagnetic cookware and the coil and a rate of change of the varying electric current through the coil. An induced eddy current flows through the resistance of the ferromagnetic cookware and dissipates heat by the Joule effect, thereby heating the ferromagnetic cookware. The resistance of the ferromagnetic cookware is dependent on its magnetic permeability, $\mu$, and its resistivity, $\rho$, as well as the frequency of excitation of the coil, such that sufficient heat can be generated for a ferromagnetic cookware with relatively high permeability and resistivity.

Figure 1:
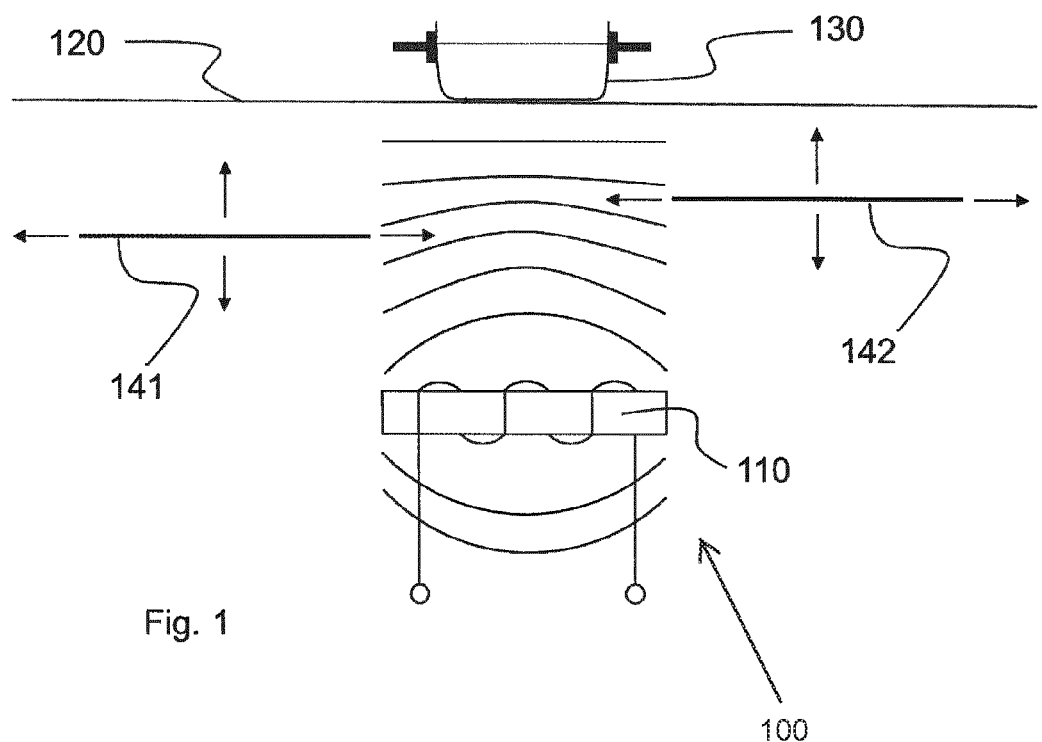
FIG. 1 shows schematically an example of an induction cooker according to the present disclosure.

Referring to FIG. 1, there is schematically shown an example of an induction cooker 100 according to the present disclosure.

The induction cooker 100 may comprise an induction heating element as an induction coil 110, a supporting structure 120, a ferromagnetic element 141 and a non-ferromagnetic element 142.

The induction coil 110, which may be made, for example, of copper wire or the like, is arranged to receive a varying electric current and produce a corresponding varying electromagnetic field.

The supporting structure 120, which may be made, for example, of ceramic material or the like, is arranged to support a ferromagnetic object 130 above the induction coil 110.

The ferromagnetic object 130, which may be made, for example, of cast iron and some alloys of stainless steel, is placed on the supporting structure 120 in the corresponding varying electromagnetic field to be magnetically coupled to the induction coil 110, analogous to the coupling between primary and secondary coils of a transformer. The ferromagnetic object 130 may be a cooking vessel such as a cooking pot, a saucepan, a frying pan, etc.

The ferromagnetic element 141, which is made of magnetisable material such as iron, cobalt, nickel, alloys thereof, rare-earth metals, etc., and the non-ferromagnetic element 142, which is made of non-magnetisable material such as copper, aluminium, etc., are arranged to be located between the supporting structure 120 and the induction coil 110. The ferromagnetic element 141 and the non-ferromagnetic element 142 may, for example, be plates of any shape (e.g., rectangular, square, round, etc.) and be disposed in a horizontal plane or in an inclined plane with respect to the supporting structure 120. As illustrated by arrows in FIG. 1, the ferromagnetic element 141 and the non-ferromagnetic element 142 can move horizontally and/or vertically and are arranged to move in the corresponding varying electromagnetic field between the induction coil 110 and the ferromagnetic object 130.

The mutual inductance between the induction coil 110 and the ferromagnetic object 130 gives a quantifiable indication of the magnetic coupling between each other. The higher the mutual inductance is, the higher the magnetic coupling is. Conversely, the lower the mutual inductance is, the lower the magnetic coupling is.

Figure 2:
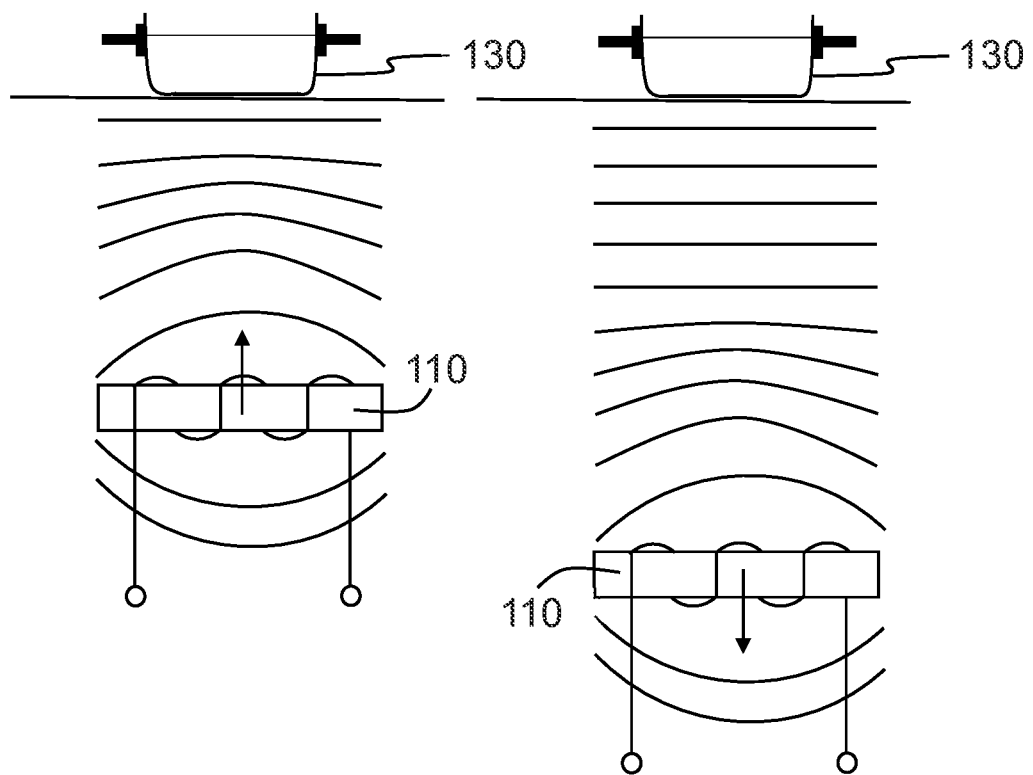
FIG. 2 shows schematically an example of an induction coil moving toward and away from a ferromagnetic cookware.

Referring to FIG. 2 in which the induction coil 110 moves toward and away from the ferromagnetic object 130, it can be observed that the mutual inductance between the induction coil 110 and a ferromagnetic object 130 is dependent on the relative positioning of each other. In other words, the mutual inductance is dependent on the air gap between each other in such a manner that the closer the gap between the induction coil 110 and the ferromagnetic object 130 is, the higher the magnetic coupling between each other is and the higher the mutual inductance is. Conversely, the farther the gap between the induction coil 110 and the ferromagnetic object 130 is, the lower the magnetic coupling between each other is and the lower the mutual inductance is.

In an example embodiment, the ferromagnetic object 130 is placed on the supporting structure 120 above the induction coil 110 to be in the varying electromagnetic field produced by the induction coil 110. Then, the mutual inductance between the induction coil 110 and the ferromagnetic object 130 is determined by measurement, knowing that each ferromagnetic object 130 has its own magnetic properties. The determination may, for example, be performed by a controller (not shown) inside the induction cooker 100. Based on the value of the determined mutual inductance, the ferromagnetic element 141 and/or the non-ferromagnetic element 142 may selectively move in the corresponding varying electromagnetic field between the induction coil 110 and the ferromagnetic object 130 to a respective position. The displacement of the ferromagnetic and non-ferromagnetic elements 141, 142 to their respective position may, for example, be controlled by the controller inside the induction cooker 100.

In particular, the ferromagnetic element 141 is arranged to move horizontally and/or vertically in the corresponding varying electromagnetic field in order to increase the mutual inductance between the induction coil 110 and the ferromagnetic object 130 when the mutual inductance determined prior to displacement of the ferromagnetic element 141 is relatively low. It may be the case when the ferromagnetic properties (e.g., magnetic permeability, resistivity, etc.) of the ferromagnetic object 130 are relatively low so as to prevent the ferromagnetic object 130 from generating sufficient heat, e.g., for cooking. The insertion of the ferromagnetic element 141 between the induction coil 110 and the ferromagnetic object 130 causes the dielectrics properties of the air gap between each other to be modified.

The mutual inductance determined prior to displacement of the ferromagnetic and non-ferromagnetic elements 141, 142 may be designated, in the following, as a reference mutual inductance value.

The position of the ferromagnetic element 141 can be reached when the mutual inductance has increased until a value of the mutual inductance measured at said position exceeds said reference mutual inductance value. In an example embodiment, a target mutual inductance, which is higher than the reference mutual inductance value in the event of a displacement of the ferromagnetic element 141, may be defined and the position of the ferromagnetic element 141 may be reached when the value of the mutual inductance measured at said position is equal or close to the value of the target mutual inductance.

On the other hand, the non-ferromagnetic element 142 is arranged to move horizontally and/or vertically to a respective position in the corresponding varying electromagnetic field in order to reduce the mutual inductance between the induction coil 110 and the ferromagnetic object 130 when the mutual inductance determined prior to displacement of the non-ferromagnetic element 142 is relatively high. It may be the case when the ferromagnetic properties (e.g., magnetic permeability, resistivity, etc.) of the ferromagnetic object 130 are relatively high so as to lead to overheating and resulting material damage. The insertion of the non-ferromagnetic element 142 between the induction coil 110 and the ferromagnetic object 130 causes the dielectrics properties of the air gap between each other to be modified.

The position of the non-ferromagnetic element 142 can be reached when the mutual inductance has decreased until a value of the mutual inductance measured at said position is below said reference mutual inductance value. In an example embodiment, a target mutual inductance, which is lower than the reference mutual inductance value in the event of a displacement of the non-ferromagnetic element 142, may be defined and the position of the non-ferromagnetic element 142 may be reached when the value of the mutual inductance measured at said position is equal or close to the value of the target mutual inductance.

Although the position is determined based on a mutual inductance measurement, it may, in another example embodiment, be based on a heating measurement for the ferromagnetic object 130. For example, when the heating for the ferromagnetic object 130 is below a reference heating value, the position of the ferromagnetic element 141 may be reached when the heating has increased until a value of heating measured at said position exceeds the reference heating value. On the other hand, when the heating for the ferromagnetic object 130 exceeds a reference heating value, the position of the non-ferromagnetic element 142 may be reached when the heating has decreased until a value of heating measured at said position is below the reference heating value. By analogy with the target mutual inductance, a target heating value may accordingly be defined.

In an example embodiment, the induction cooker 100 may comprise a plurality of different ferromagnetic elements 141 and a plurality of different non-ferromagnetic elements 142. Based on the value of the initially determined mutual inductance between the induction coil 110 and the corresponding ferromagnetic object 130, one or more elements among the different ferromagnetic and non-ferromagnetic elements 141, 142 may selectively move in the corresponding varying electromagnetic field. Thereby, the value of the target mutual inductance can be more accurately obtained.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium such as a solid-state drive (SSD) or other semiconductor-based read access memory (RAM), a read only memory (ROM) such as a compact disc (CD) ROM or a semiconductor ROM, a magnetic recording medium such as a floppy disk or a hard disk, optical memory devices in general and so on.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An induction cooker comprising:
   an induction coil, which is arranged to receive a varying electric current and produce a corresponding varying electromagnetic field;
   a supporting structure, which is arranged to support a ferromagnetic object above the induction coil, the ferromagnetic object being placed in the corresponding varying electromagnetic field to be magnetically coupled to the induction coil, thereby determining a mutual inductance between the induction coil and the ferromagnetic object;
   a ferromagnetic element and a non-ferromagnetic element located between the supporting structure and the induction coil,
   wherein:
   at least one of the ferromagnetic element and the non-ferromagnetic element can selectively move in the corresponding varying electromagnetic field based on the mutual inductance between the induction coil and the ferromagnetic object.

2. The induction cooker of claim 1, wherein the ferromagnetic element and the non-ferromagnetic element move at least one of horizontally and vertically.

3. The induction cooker of claim 1, wherein the ferromagnetic element moves in the corresponding varying electromagnetic field to increase the mutual inductance between the induction coil and the ferromagnetic object, and the non-ferromagnetic element moves in the corresponding varying electromagnetic field to reduce the mutual inductance between the induction coil and the ferromagnetic object.

4. The induction cooker of claim 1, wherein the ferromagnetic element moves in the corresponding varying electromagnetic field to a position for which a value of mutual inductance between the induction coil and the ferromagnetic object is higher than the value of mutual inductance between the induction coil and the ferromagnetic object prior to displacement of the ferromagnetic element.

5. The induction cooker of claim 1, wherein the non-ferromagnetic element moves in the corresponding varying electromagnetic field to a position for which a value of mutual inductance between the induction coil and the ferromagnetic object is lower than the value of mutual inductance between the induction coil and the ferromagnetic object prior to displacement of the non-ferromagnetic element.

6. The induction cooker of claim 1, wherein the induction coil is arranged to move toward or away from the ferromagnetic object.

7. A method of operating an induction cooker, the method comprising:

receiving, at an induction coil, a varying electric current;

producing, at the induction coil, a corresponding varying electromagnetic field;

supporting, at a supporting structure, a ferromagnetic object above the induction coil, the ferromagnetic object being placed in the corresponding varying electromagnetic field to be magnetically coupled to the induction coil, thereby determining a mutual inductance between the induction coil and the ferromagnetic object; and selectively moving at least one of a ferromagnetic element and a non-ferromagnetic element in the corresponding varying electromagnetic field based on the mutual inductance between the induction coil and the ferromagnetic object, the ferromagnetic element and the non-ferromagnetic element being located between the supporting structure and the induction coil.

8. The method of claim 7, wherein selectively moving the at least one of the ferromagnetic element and the non-ferromagnetic element comprises:

moving the ferromagnetic element in the corresponding varying electromagnetic field to increase the mutual inductance between the induction coil and the ferromagnetic object; and moving the non-ferromagnetic element in the corresponding varying electromagnetic field to reduce the mutual inductance between the induction coil and the ferromagnetic object.

9. The method of claim 7, wherein selectively moving a ferromagnetic element comprises:

moving the ferromagnetic element in the corresponding varying electromagnetic field to a position for which a value of mutual inductance between the induction coil and the ferromagnetic object is higher than the value of mutual inductance between the induction coil and the ferromagnetic object prior to displacement of the ferromagnetic element.

10. The method of claim 7, wherein selectively moving a non-ferromagnetic element comprises:

moving the non-ferromagnetic element in the corresponding varying electromagnetic field to a position for which a value of mutual inductance between the induction coil and the ferromagnetic object is lower than the value of mutual inductance between the induction coil and the ferromagnetic object prior to displacement of the non-ferromagnetic element.

11. The method of claim 7, wherein the ferromagnetic element and the non-ferromagnetic element move at least one of horizontally and vertically.

12. The method of claim 7, wherein the induction coil is arranged to move toward or away from the ferromagnetic object.

* * * * *